(12) United States Patent
Uji et al.

(10) Patent No.: US 7,852,583 B2
(45) Date of Patent: Dec. 14, 2010

(54) DISK DRIVE DEVICE, ALTITUDE DETERMINATION METHOD THEREFORE AND METHOD FOR DETERMINING CHARACTERISTIC OF HEAD ELEMENT PORTION

(75) Inventors: Yoshiaki Uji, Tokyo (JP); Minoru Shimada, Kanagawa (JP); Ryoh Miura, Kanagawa (JP); Takahiro Watanabe, Kanagawa (JP); Toyomi Ohsawa, Kanagawa (JP); Noriaki Satoh, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 356 days.

(21) Appl. No.: 12/012,340

(22) Filed: Jan. 31, 2008

(65) Prior Publication Data
US 2008/0212226 A1    Sep. 4, 2008

(30) Foreign Application Priority Data
Jan. 31, 2007    (JP)    ............... 2007-022455

(51) Int. Cl.
G11B 27/36    (2006.01)
(52) U.S. Cl. .......................... 360/31; 360/75
(58) Field of Classification Search ......... None
See application file for complete search history.

(56) References Cited

U.S. PATENT DOCUMENTS

| | | | |
|---|---|---|---|
| 5,909,330 A * | 6/1999 | Carlson et al. ................ | 360/31 |
| 6,771,440 B2 * | 8/2004 | Smith ........................... | 360/31 |
| 7,016,131 B2 * | 3/2006 | Liu et al. ...................... | 360/31 |
| 7,046,473 B2 | 5/2006 | Fu et al. | |
| 7,310,194 B1 * | 12/2007 | Schardt et al. ................ | 360/75 |
| 7,486,459 B1 * | 2/2009 | Schreck et al. ................ | 360/31 |
| 2003/0117739 A1 * | 6/2003 | Aiello et al. .................. | 360/75 |
| 2005/0024775 A1 * | 2/2005 | Kurita et al. ............. | 360/234.3 |
| 2006/0044669 A1 | 3/2006 | Shimizu et al. | |
| 2006/0139789 A1 | 6/2006 | Yang | |

FOREIGN PATENT DOCUMENTS

| | | |
|---|---|---|
| JP | 09-063220 A | 3/1997 |
| JP | 2006-092709 A | 4/2006 |

* cited by examiner

*Primary Examiner*—Jason C Olson (57) ABSTRACT

Embodiments of the present invention allow for a precise altitude to be calculated from read-out signals of a head slider. In one embodiment, a hard disk controller/multiprocessing unit (HDC/MPU) determines a head element portion in which the instability has occurred in accordance with the resolution change. The HDC/MPU adjusts the clearance accordingly. The head element portion reads signals of different frequencies under a condition of the signal strengths coinciding with a reference value, and the HDC/MPU calculates the resolution. The HDC/MPU determines that the instability has occurred if the difference is outside the criterion. The HDC/MPU uses the read-out signal of a head slider in which the instability has not occurred to calculate the altitude.

16 Claims, 8 Drawing Sheets

| ALTITUDE | MODERATE TEMPERATURE | HIGH TEMPERATURE | LOW TEMPERATURE |
|---|---|---|---|
| 0k ft. | 3 | 2 | 4 |
| 6k ft. | 2 | 1 | 3 |
| 10k ft. | 1 | 0 | 2 |

AMPLITUDE = A0

RESOLUTION = R0

Fig. 7(a)

AMPLITUDE = A0

RESOLUTION = R0

Fig. 7(b)

AMPLITUDE = A0

RESOLUTION = R2

DISK DRIVE DEVICE, ALTITUDE DETERMINATION METHOD THEREFORE AND METHOD FOR DETERMINING CHARACTERISTIC OF HEAD ELEMENT PORTION

CROSS-REFERENCE TO RELATED APPLICATION

The instant nonprovisional patent application claims priority to Japanese Patent Application No. 2007-022455 filed Jan. 31, 2007 and which is incorporated by reference in its entirety herein for all purposes.

BACKGROUND OF THE INVENTION

Disk drive devices using various kinds of disks, such as an optical disk, a magneto-optical disk, and a flexible magnetic disk, have been known in the art. In particular, a hard disk drive (HDD) has been widely used as a storage device of a computer and has been one of indispensable disk drive devices for current computer systems. Moreover, the HDD has found widespread application such as a removable memory used in a moving image recording/reproducing device, a car navigation system, a cellular phone, or a digital camera, as well as the computer due to its outstanding characteristics.

Magnetic disks used in the HDD have data tracks formed concentrically and servo data containing address information, and on each data track a plurality of data sectors containing user data are recorded. Between each servo data, data sectors are recorded. A head element portion of a head slider supported by a swinging actuator accesses a desired data sector according to address information of servo data so that writing and reading to and from data sector can be performed.

In order to improve recording density of the magnetic disk, it is important to reduce the clearance between the head element portion flying over the magnetic disk and the magnetic disk. Hence, some mechanisms have been proposed to adjust the clearance. In one of them, a head slider is equipped with a heater which adds heat to the head element portion to adjust the clearance (refer to Japanese Patent Publication No. 2006-190454, for example). In the present specification, this is referred to as thermal flyheight control (TFC). The TFC supplies the heater with electric current to generate heat so that the thermal expansion makes the head element portion protrude. Thereby, the clearance between the magnetic disk and the head element portion is reduced. Mechanisms such as using a piezo element to adjust a clearance are known other than TFC.

The clearance varies in response to the altitude (atmospheric pressure) change in addition to temperature change (refer to Japanese Patent Publication No. 2006-092709, for example). Therefore, it is preferable to detect the altitude change in addition to the temperature change to adjust the clearance accordingly.

Typical TFC increases the heater power according to the temperature decrease to make the head element portion protrude and compensates an increase in the clearance due to the temperature decrease. The clearance between the head element portion and the magnetic disk reduces accordingly. Therefore, the TFC in accordance with the altitude change requires a scheme different from the ordinary TFC in accordance with the temperature change.

An altitude sensor (atmospheric pressure sensor) has been known as one way of detecting altitude. Use of the altitude sensor, however, results in an increase in the number of parts and the cost. The clearance between the head element portion and the magnetic disk can be determined with signal strength read out by the head element portion. Specifically, the signal strength increases with a decrease in the clearance. Thus, measuring the signal strength allows adjusting the clearance so as to compensate its changes without an altitude sensor.

It is known, however, that the read-out characteristics of the head element portion changes significantly with time of use. Here, this characteristics change is referred as instability. The read-out signal strength of the head element portion changes with the characteristics change of the head element portion. Therefore, a technique for handling the instability is required in order to determine the clearance change from the read-out signal strength.

Determination of the altitude (atmospheric pressure) is also important from another point of view. For example, measuring the clearance between the slider and the magnetic disk is as important as measuring the clearance between the head element portion and the magnetic disk. It enables to avoid a collision of the slider and the magnetic disk. In such a case, it is important to determine the altitude more precisely. Thus, it is important to eliminate or reduce the influence of the instability in determining the altitude with the read-out signal.

BRIEF SUMMARY OF THE INVENTION

Embodiments of the present invention is to allow a precise altitude to be calculated from read-out signals of a head slider. According to the particular embodiment of FIG. 1, the hard disk controller/multiprocessing unit (HDC/MPU) 23 determines a head element portion 122 in which the instability has occurred in accordance with the resolution change. The HDC/MPU 23 adjusts the clearance (S11). The head element portion 122 reads signals of different frequencies under a condition of the signal strengths coinciding with a reference value (S12), and the HDC/MPU 23 calculates the resolution. The HDC/MPU 23 determines that the instability has occurred (S16) if the difference is outside the criterion. The HDC/MPU 23 uses the read-out signal of a head slider in which the instability has not occurred to calculate the altitude.

DETAILED DESCRIPTION OF THE INVENTION

Embodiments of the present invention relate to a disk drive device, an altitude determination method therefore, and a method for determining characteristics of head element portion, in particular to a technique handling variations in a clearance between a head element portion and a disk.

A method according to an aspect of embodiments of the invention adjusts a clearance between a head element portion and a disk such that a read-out signal strength of the head element portion conforms to a corresponding reference value. The method reads out signals of different write frequencies after the clearance adjustment to calculate a value representing a ratio of signal strengths thereof. It compares the calculated value representing the ratio and a corresponding reference value to determine a characteristics change in the head element portion. It allows determining the characteristics change of the head element portion precisely.

In one embodiment, the method determines a signal strength change with respect to a signal from a head element portion different from a head element portion of which characteristics change is outside a criterion, and determines an altitude change based on the determined signal strength change. It allows precise determination of the altitude. Further, it is more preferable to determine signal strength changes with respect to a plurality of head element portions different from the head element portion whose characteristics change is outside the criterion and determine the altitude change based on the determined signal strength changes of the plurality of head element portions. It allows to determine the altitude more precisely.

In one embodiment, the method determines a signal strength change with respect to a signal from a head element portion different from a head element portion of which characteristics change is outside a criterion, and adjusts a clearance between a head element portion and a disk based on the determined signal strength change. It enables to adjust the clearance precisely.

Another aspect of embodiments of the present invention is a disk drive device comprising: a head element portion for accessing a disk; a moving mechanism for supporting and moving the head element portion over the disk; an adjusting mechanism for adjusting a clearance between the disk and the head element portion; and a controller for controlling the moving mechanism and the adjusting mechanism. The adjusting mechanism adjusts a clearance between the head element portion and a disk such that a read-out signal strength conforms to a corresponding reference value. The head element portion reads out signals of different write frequencies after the clearance adjustment. The controller calculates a value representing a ratio of signal strengths of the different write frequencies and compares the calculated value representing the ratio and a corresponding reference value to determine whether a characteristics change of the head element portion is outside a criterion. It allows determining the characteristics change of the head element portion precisely.

Another aspect of embodiments of the present invention is a method for determining altitude in a disk drive device comprising. It reads out signals of different write frequencies by a head element portion to calculate a value representing a ratio of signal strengths thereof, calculates a clearance change between the head element portion and a disk based on the calculated ratio of signal strengths and a ratio of signal strengths at a reference altitude, and determines altitude based on the calculated clearance change. It allows determining the altitude precisely from the signal strength regardless of the head characteristics change.

Preferably, values representing ratios of signal strengths of a plurality of head element portions are calculated, and altitude is determined based on the calculated values. It allows determining the altitude more precisely. Or, it adjusts a clearance between a head element portion and a disk based on the determined altitude. It enables to adjust the clearance precisely.

Another aspect of embodiments of the present invention is a disk drive device comprising: a head element portion for accessing a disk; a moving mechanism for supporting and moving the head element portion over the disk; a adjusting mechanism for adjusting a clearance between the disk and the head element portion; and a controller for controlling the moving mechanism and the adjusting mechanism. The head element portion reads out signals of different write frequencies. The controller calculates a value representing a ratio of signal strengths of the different write frequencies, calculates a clearance change between the head element portion and a disk based on the calculated ratio of signal strengths and a ratio of signal strengths at a reference altitude, and determines altitude based on the calculated clearance change. It allows determining the altitude precisely from the signal strength regardless of the head characteristics change.

Another aspect of embodiments of the present invention is a disk drive device comprising: a slider for flying over a rotating disk, a head element portion on the slider for accessing the disk, a heater on the slider for protruding the head element portion by thermal expansion to adjust a clearance between the disk and the head element portion; a moving mechanism for supporting and moving the slider; and a controller for controlling the moving mechanism and the heater, and adjusting the clearance by reducing a heater power to the heater in accordance with an increase in altitude. It enables to depress the clearance change with an increase in the altitude.

The controller may adjust a clearance between the head element portion and the disk such that a read-out signal strength of the head element portion conforms to a corresponding reference value, the head element portion reads out signals of different write frequencies after the clearance adjustment, and the controller calculates a value representing a ratio of signal strengths of the different write frequencies and compares the calculated value representing the ratio and a corresponding reference value to determine whether a characteristics change of the head element portion is outside a criterion. It allows determining the characteristics change of the head element portion precisely.

The head element portion may read out signals of different write frequencies, and the controller calculates a value representing a ratio of signal strengths of the different write frequencies, calculates a clearance change between the head element portion and a disk based on the calculated ratio of signal strengths and a ratio of signal strengths at a reference altitude, and determines altitude based on the calculated clearance change. It allows determining the altitude precisely from the signal strength regardless of the head characteristics change.

Embodiments of the present invention provide an appropriate technique for a clearance change between a head element portion and a magnetic disk in a disk drive device.

Hereinafter, a preferred embodiment of the present invention is described. For clearness of explanation, the following description and the accompanying drawings contain omissions and simplifications as appropriate. Throughout the drawings, the same components are denoted by like reference numerals, and their repetitive description is omitted if not necessary for the sake of clearness. Hereinafter, preferred embodiments of the present invention will be described by way of example of a hard disk drive (HDD) as an example of the disk drive devices.

Figure 1:
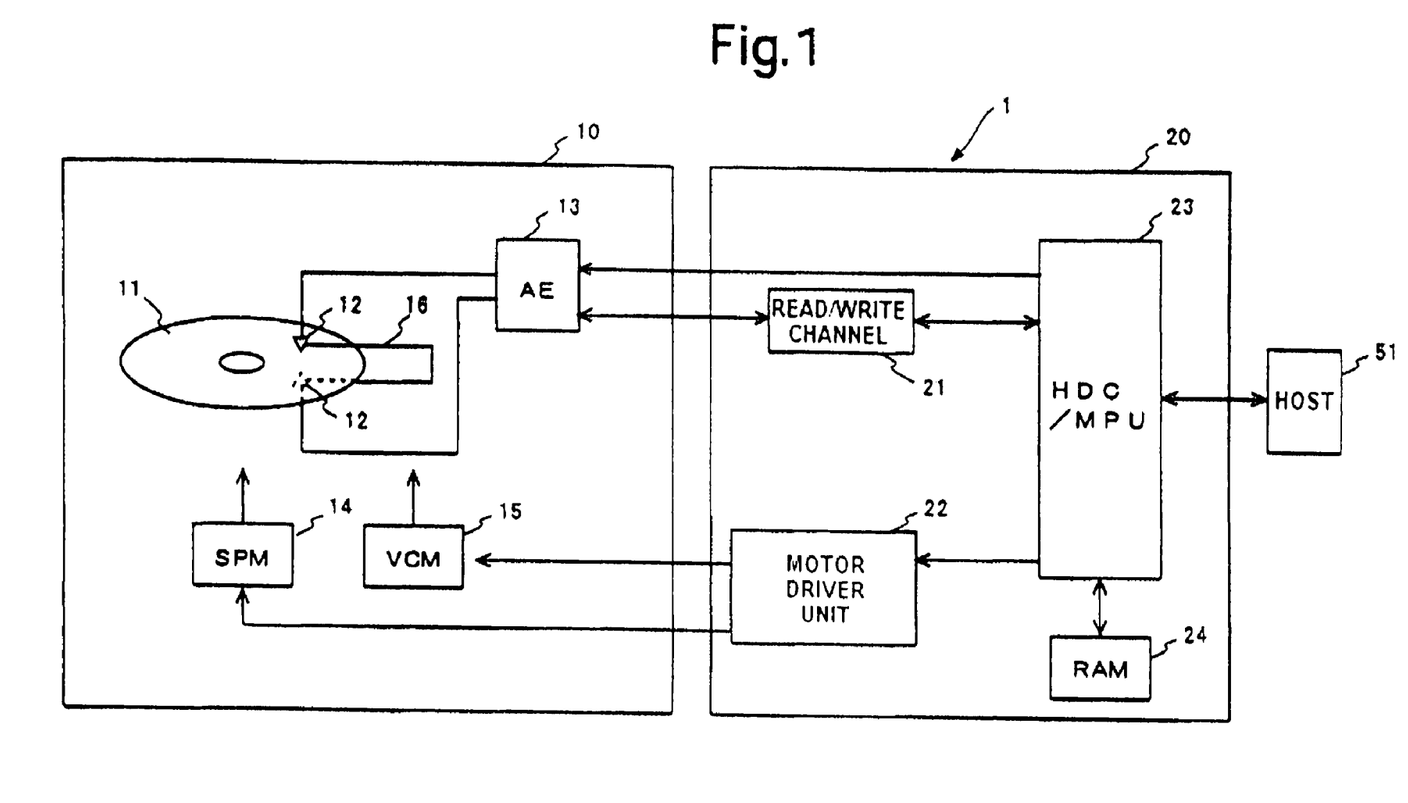
FIG. 1 is a block diagram schematically showing an entire configuration of the HDD, in one embodiment.

First, a configuration of an entire HDD will be outlined. FIG. 1 shows a schematic configuration of an entire HDD 1 according to the present embodiment. As shown in FIG. 1, the HDD 1 has a magnetic disk 11 which is an example of a recording disk, a head slider 12, an arm electronics (AE) 13, a spindle motor (SPM) 14, a voice coil motor (VCM) 15, and an actuator 16 in an enclosure 10. The HDD 1 further includes a circuit board 20 fixed on the outside of the enclosure 10. On the circuit board 20, circuits such as a read write channel (RW channel) 21, a motor driver unit 22, an integrated circuit of a hard disk controller (HDC) and a multiprocessing unit (MPU) (HDC/MPU) 23, and a RAM 24.

The SPM 14 rotates the magnetic disk at a predetermined angular rate. The motor driver unit 22 drives the SPM 14 in accordance with control data from the HDC/MPU 23. Each head slider 12 includes a slider for flying over the magnetic disk, and a head element portion which is fixed to the slider and converts magnetic signals to and from electric signals. The head slider 12 of the present embodiment includes a heater for thermal flyheight control (TFC) which makes the head element portion expand and protrude by heating to adjust the clearance between the head element portion and the magnetic disk 11. The structure of the head slider 12 will be described in detail later referring to FIG. 2.

The head sliders 12 are fixed at the tip end portion of the actuator 16. The actuator 16 is coupled to the VCM 15 and pivots around a pivotal axis to move the head sliders 12 above the rotating disk 11 in the radial direction thereof. The motor driver unit 22 drives the VCM 15 in accordance with the control data from the HDC/MPU 23. The AE 13 selects the head element portion 12 for accessing (reading) the magnetic disk 11 from the plurality of head element portions 12, amplifies a reproduction signal reproduced by the selected head element portion 12, and sends it to the R/W channel 21. The AE 13 also sends a recording signal from the R/W channel 21 to the selected head element portion 12. The AE 13 further supplies electric current (electric power) to the heater of the selected head element portion 12 in accordance with the control data from the HDC/MPU 23 and functions as an adjustment circuit for adjusting the electric energy.

In a reading process, the RW channel 21 amplifies the read signals supplied from the AE13 to constant amplitude with auto gain control using a variable gain amplifier. Then, it extracts data from the obtained read signals and carries out a decoding process. The decoded read data is supplied to the HDC/MPU 23. In a writing process, the RW channel 21 modulates codes of the write data supplied from the HDC/MPU 23, converts the code-modulated data to write signals, and supplies them to the AE 13.

In the HDC/MPU 23 which is an example of a controller, the MPU operates in accordance with firmware loaded in the RAM 24. The HDC/MPU 23 carries out entire control of the HDD 1 in addition to necessary processes concerning data process, such as reading/writing processing control, order management of command execution, positioning control (servo control) of the head slider 12 utilizing a servo signal, interface control between a host 51, the HDC/MPU 23, and defect management, and an error handling procedure if an error occurs. Further, the HDC/MPU 23 of the present embodiment performs the TFC, and it determines the characteristics change of the head element portion 12 based on the read-out signal strength of the head element portion 12 or determines the altitude change (atmospheric pressure change) based on the read-out signal strength. These will be described later.

Figure 2:
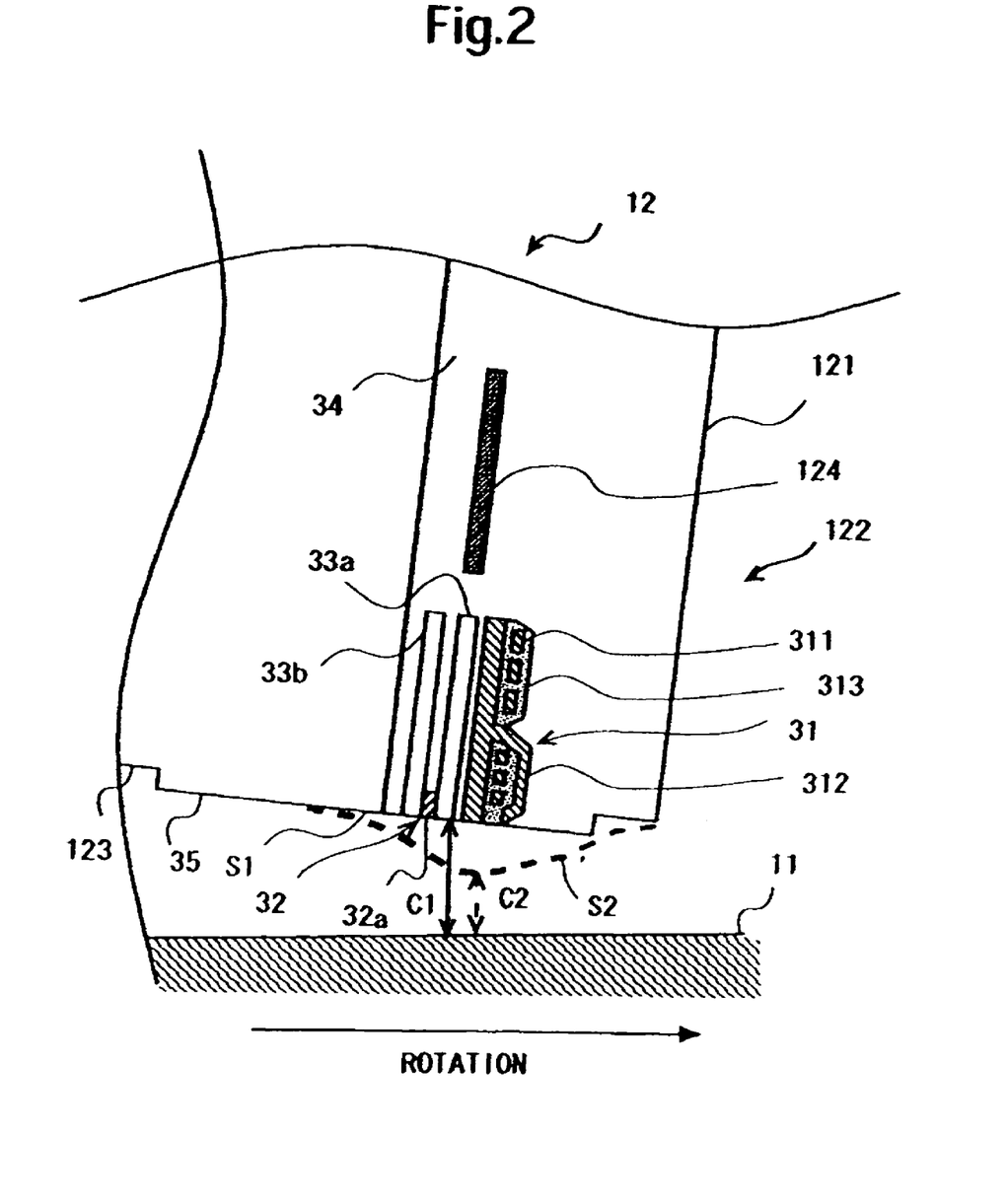
FIG. 2 is a cross-sectional view schematically showing a configuration of the head slider equipped with the heater for the TFC, in one embodiment.

Next, the configuration of the TFC head slider 12 according to the present embodiment is described. FIG. 2 is a cross-sectional view showing a partial configuration near the air flowing out end surface (trailing side end surface) 121 of the head slider 12. The magnetic disk 11 rotates from the left to the right of FIG. 2. The head slider 12 includes a head element portion 122 and a slider 123 supporting the head element portion 122. The head element portion 122 includes a read element 32 and a write element 31. The write element 31 generates a magnetic field between the magnetic poles 312 by current flowing through a write coil 311, and records the magnetic data to the magnetic disk 11. The read element 32 has a magneto-resistive element 32a with magnetic anisotropy, and reads out the magnetic data recorded in the magnetic disk 11 in accordance with its resistance which is variable due to the magnetic field from the magnetic disk 11

The magneto-resistive element 32a is sandwiched between magnetic shields 33a and 33b, and the write coil 311 is surrounded by an insulating film 313. A protective film 34 made of alumina or the like is formed around the write element 31 and the read element 32. A heater 124 is formed near the write element 31 and the read element 32. The heater 124 may be made of a winded thin film resistive element of Permalloy with alumina filling the gap.

When the AE 13 applies current to the heater 124, the surrounding part of the head element 122 protrudes to change its shape due to the heat by the heater 124. When the heater is not heated, an air bearing surface (ABS) of the head slider 12 is shaped as illustrated by S1 and the clearance which is a gap between the head element portion 122 and the magnetic disk is illustrated by C1. The protruding shape S2 at the time the heater 124 is heated is schematically illustrated by a dashed line in FIG. 2. The head element portion 122 comes close to the magnetic disk 11 and the clearance C2 at this time is smaller than the clearance C1. Here, FIG. 2 is conceptual and the dimensions are not actual. The protruding amount of the head element portion 122 or the clearance between the head element portion 122 and the magnetic disk 11 changes in accordance with the heater power supplied to the heater 124.

Figure 3A:
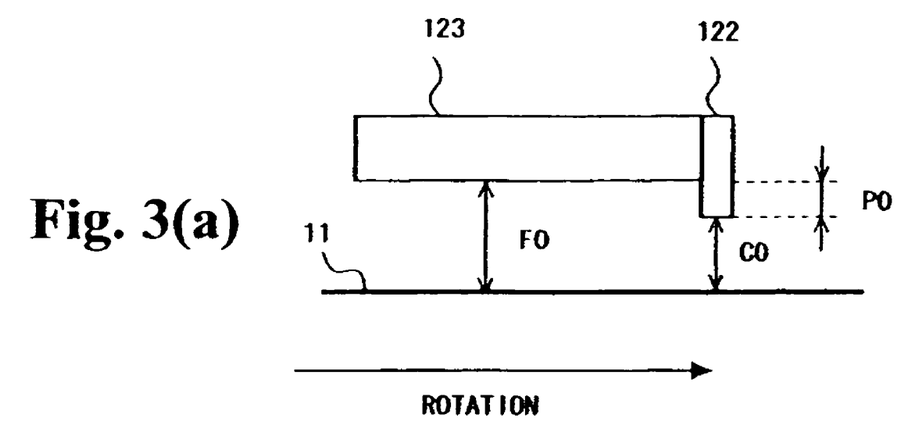
FIGS. 3(a) and 3(b) illustrate examples of TFC in accordance with an altitude change.
Figure 3B:
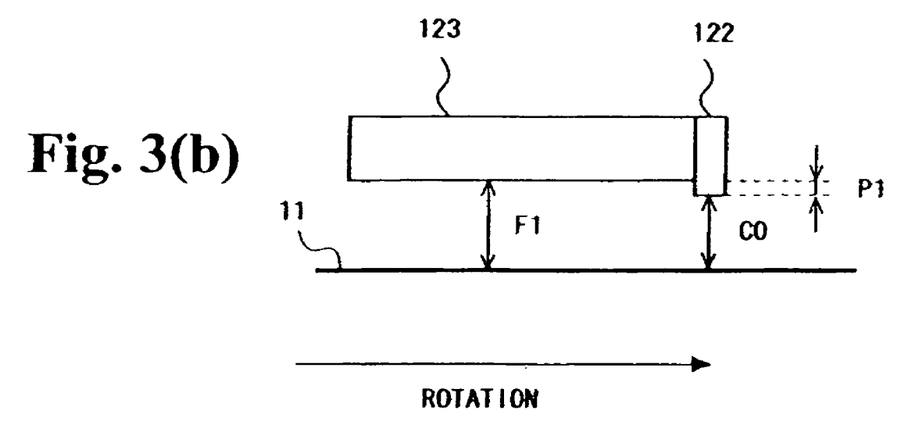

Next, the TFC of the present embodiment in accordance with altitude is described. If the altitude increases, atmospheric pressure decreases, and the flying height of the head slider 12 decreases. Thus, the HDC/MPU 23 is required to reduce the protrusion amount of the head element portion 122 with an increase in the altitude. FIGS. 3($a$) and 3($b$) illustrate an example of TFC in accordance with the altitude change. As shown in FIG. 3($a$), the TFC according to the present embodiment supplies the heater 124 with a predetermined heater power to make the head element portion 122 protrude at the minimum altitude in use, specifically at sea level. If the clearance between the head element portion 122 and the magnetic disk 11 decreases with an increase in the altitude, it decreases the heater power and the protrusion amount so as to compensate the decrease in the clearance to depress the clearance change.

In the drawing of FIG. 3($a$) illustrating a state at the minimum altitude, the clearance between the slider 123 and the magnetic disk 11 (slider flying height) is denoted by F0, the clearance between the head element portion 122 and the magnetic disk 11 is denoted by C0, and the protrusion amount of the head element portion 122 from the ABS of the slider 123 is denoted by P0. In the drawing of FIG. 3($b$) illustrating a state at a higher altitude, the slider flying height is denoted by F1, the clearance between the head element portion 122 and the magnetic disk 11 is denoted by C1, and the protrusion amount of the head element portion 122 from the ABS of the slider 123 is denoted by P1.

Since the slider flying height decreases with an increase in the altitude, the relationship of F1<F0 is satisfied. The HDC/MPU 23 decreases the heater power to compensate the decrease in the clearance so that P1<P0 is established. Thus, the clearance between the head element portion 122 and the magnetic disk 11 stays at the same C0 at any altitude. Although the above described example compensates the whole clearance change, the heater power may be adjusted to compensate a part of the clearance change. Otherwise, the protrusion amount more than the decrease in the slider flying height may be reduced based on the design.

Thus, providing a bias in the heater power at the minimum altitude and reducing the heater power with an increase in the altitude allows an appropriate adjustment of the clearance in accordance with an altitude change. The clearance varies with other conditions such as temperature. Therefore, the HDC/MPU 23 controls the heater power in accordance with the total conditions including the altitude and other conditions. For example, if the temperature is high, the heater power may be set at substantially 0 even at sea level. Or, the heater power may be kept at substantially 0 in data writing because of the heat of the write coil 311.

Therefore, at least in the read operation in a specific temperature range, the HDC/MPU 23 supplies a specific heater power to the heater 122 at the minimum altitude in use unless other conditions change largely. The HDC/MPU 23 reduces the heater power as the altitude increases (which means the pressure decreases). Or, the HDC/MPU 23 controls to reduce the increase in the heater power if the temperature decreases and the altitude increases, compared to staying at the same altitude.

Figure 4:
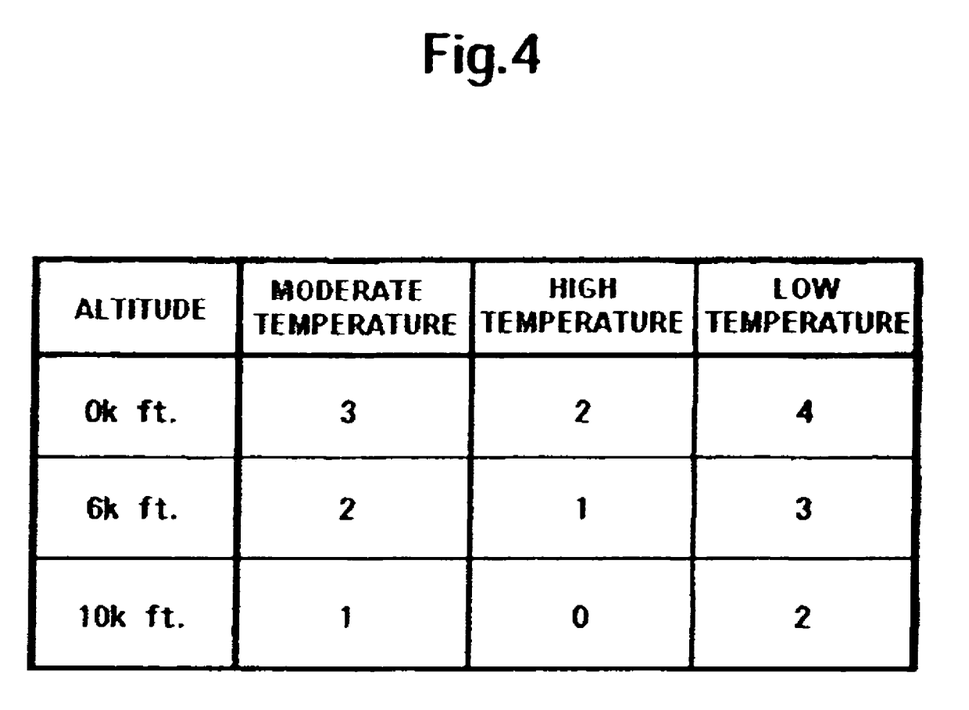
FIG. 4 shows an example of TFC for dividing the altitude and temperature ranges into some regions.

The HDC/MPU 23 may change the heater power continuously with an increase in the altitude, or it may divide the altitude range into some regions, keep the same heater power in a region and change the heater power if the detected altitude moves from one region to another. FIG. 4 shows an example of TFC dividing altitude and temperature ranges into some regions. In the altitude range from 0 kft. to 6 kft., the heater powers for a moderate temperature region, a high temperature region and a low temperature region are 3, 2, 4, respectively. The larger number indicates the larger heater power. In each temperature region, the heater power decreases with an increase in the altitude.

Figure 5:
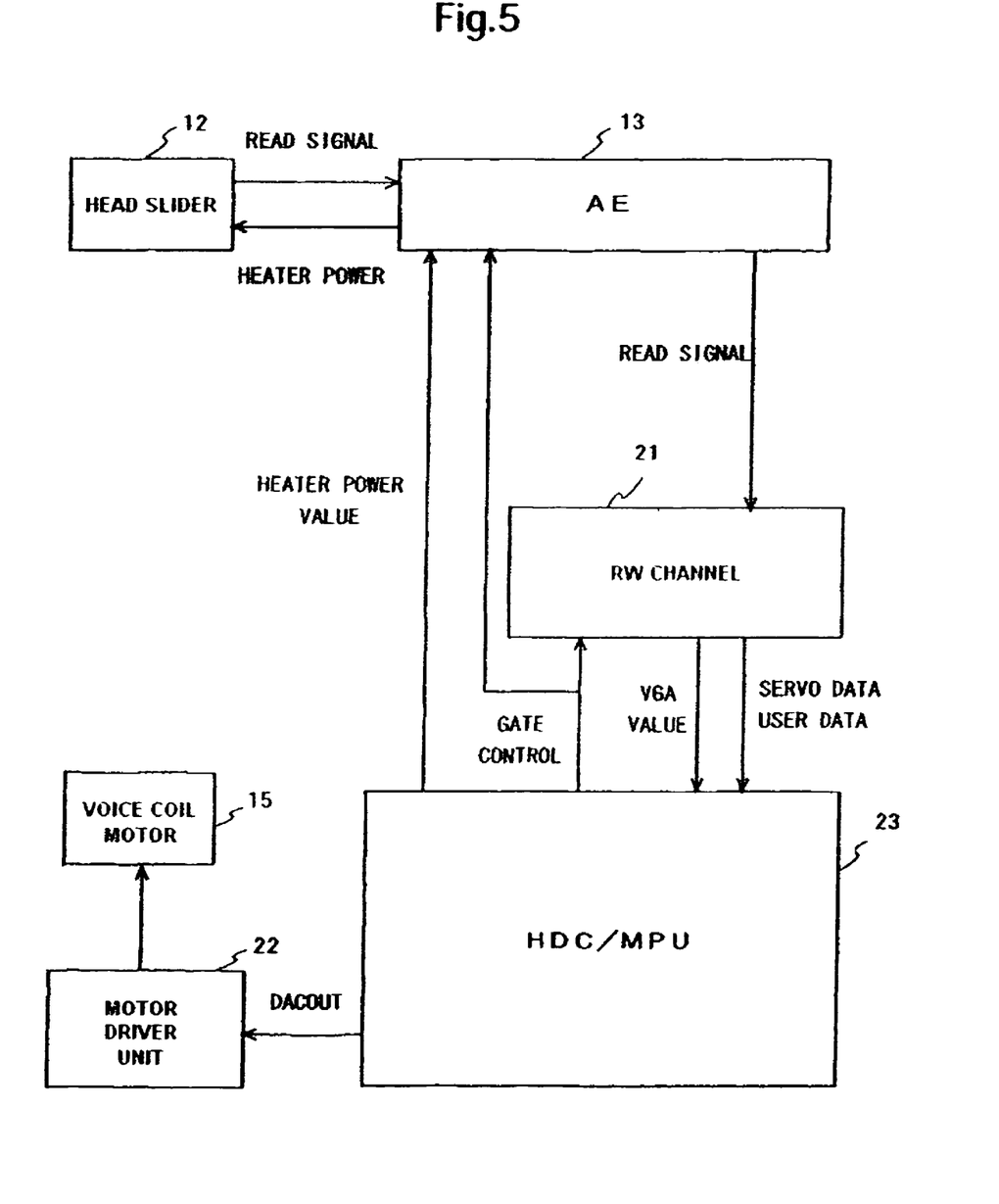
FIG. 5 is a block diagram schematically showing control of circuit elements by the HDC/MPU.

The HDC/MPU 23 changes the power value supplied to the heater 124 by controlling the AE 13. FIG. 5 is a block diagram illustrating the control of circuit elements by the HDC/MPU 23. As shown in FIG. 5, the HDC/MPU 23 stores data (HEATER POWER VALUE) representing the heater power value in a register of the AE 13. The AE 13 supplies the heater 124 of a selected head slider 124 with the power (HEATER POWER) represented by the data stored in the register in accordance with a control signal of read/write timing (GATE CONTROL) from the HDC/MPU 23.

The TFC in accordance with the altitude is required to measure the altitude (atmospheric pressure). The HDD 1, for example, may measure the altitude (atmospheric pressure) by an implemented altitude sensor (atmospheric pressure sensor). Use of the altitude sensor, however, results in increases in the number of parts and cost. Therefore, it is preferable to measure the altitude with the strength of the read-out signal of the read element 32. The signal strength increases as the clearance between the head element portion 122 and the magnetic disk 11 decreases and it decreases as the clearance increases. Determining the altitude sensitivity for each head element portion 122 beforehand allows determining the altitude change in accordance with the signal strength change.

More specific operations in the HDD 1 are explained. A reference signal strength and sensitivity for a reference altitude such as sea level are determined and set in the HDD 1 in the designing and manufacturing stage. Typically, the TFC power is set at 0. The HDC/MPU 23 refers to the reference signal strength and sensitivity to determine the present altitude by the detected signal strength.

Since the sensitivity and the reference signal strength change with the temperature, the values referred by HDC/MPU 23 change with the temperature detected by a temperature sensor (not shown). A reference signal for measuring the signal strength is a burst signal and preferably prerecorded in a control area (an area which is not used for user data) on the magnetic disk 11. Preferably, the signal recorded area of the burst signal has a larger size in the track width direction than the read width so as to avoid an adverse effect by a deviation in head positioning.

A clearance change Δd between the head element portion 122 (read element) and the magnetic disk can be calculated from the change of the signal strength. More specifically, using a reference signal strength (amplitude) A0 and a measured signal strength A1, a following equation is satisfied.

$$A1/A0 -= \exp(-2\pi \Delta d/\lambda)$$ (Equation 1)

The equation 1 is well known and the detail description is omitted. In the equation, λ is the write wavelength of the recorded signal used for the measurement of the signal strength. The HDC/MPU 23 uses the preset sensitivity between the clearance change and the altitude to determine the altitude (altitude change) using the clearance change calculated with the equation 1. The value of the signal strength for the altitude calculation, for example, may be an average of some sampled measured values.

The HDC/MPU 23 can obtain the strength of the read-out signal (READ SIGNAL) by referring to a VGA gain value (VGA VALUE) of the RW channel 21. As explained by referring to FIG. 1, the RW channel 21 carries out AGC with a VGA to amplify read-out signals from the AE 13 to constant amplitude. Therefore, the gain value of the VGA (VGA VALUE) is inversely proportional to the signal strength, and the reciprocal of the gain value of the VGA represents the signal strength. The RW channel 21 has a register for storing a gain value of the VGA (VGA VALUE) and the HDC/MPU 23 accesses the register to obtain the gain value of the VGA (VGA VALUE).

The read-out signal strength of the read element 32 changes due to the instability (head characteristics change) of the read element 32 regardless of the clearance. The change in the head characteristics may exhibit a decrease or increase in the signal amplitude. Thus, it is required to avoid the effect of the instability in order to measure the clearance change and the altitude change with the read-out signal strength.

In this article, two methods are explained for avoiding the effect of the instability. One method identifies head element portions 122 in which the instability has occurred and uses the read-out signal of another different head element portion 122 to measure the clearance change and the altitude change. The other method determines the clearance change of a head element portion 122 from the read-out signal strength even if the instability has occurred in the head element portion 122.

First, a way to identify a head element portion 122 in which the instability has occurred is explained. The head element portion 122 reads out signals of different write frequencies and the HDC/MPU 23 uses each signal strength to identify the head element portion 122 in which the instability has occurred. First, preconditions are explained.

Signals of frequency f1 and f2 are written on the magnetic disk 11. The read-out signal strength of the frequency f1 is denoted by Af1 and the read-out signal strength of the frequency f2 is denoted by Af2. It is known that the following relationship among them is satisfied.

$$Af1/Af2 = C \times \exp(2\pi d(1/\lambda 2 - 1/\lambda 1)) \quad \text{(Equation 2)}$$

λ1 and λ2 are the wavelengths of the frequency f1 and f2, respectively. C is a constant and d is the clearance of the read element 32. In this article, the ratio of the read-out signal strengths (Af1/Af2) are referred as resolution.

As understood from the equation 2, if the clearance d does not change, the resolution (Af1/Af2) is constant. Therefore, if the clearance d is constant and the resolution changes, it means the characteristics change in the read element has occurred. The scheme of the present embodiment uses this point to identify the head element portion 122 (read element 32) in which the instability has occurred.

Figure 6A:
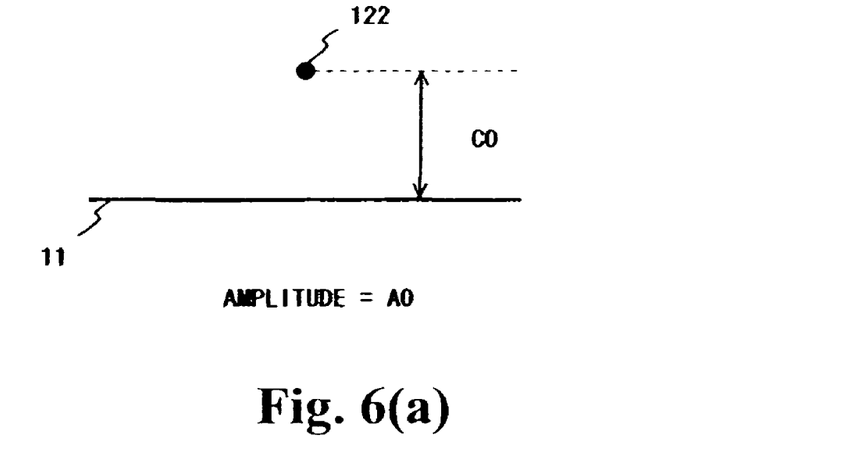
FIGS. 6(a)-6(c) illustrate relationships between a signal strength change and a clearance change.
Figure 6B:
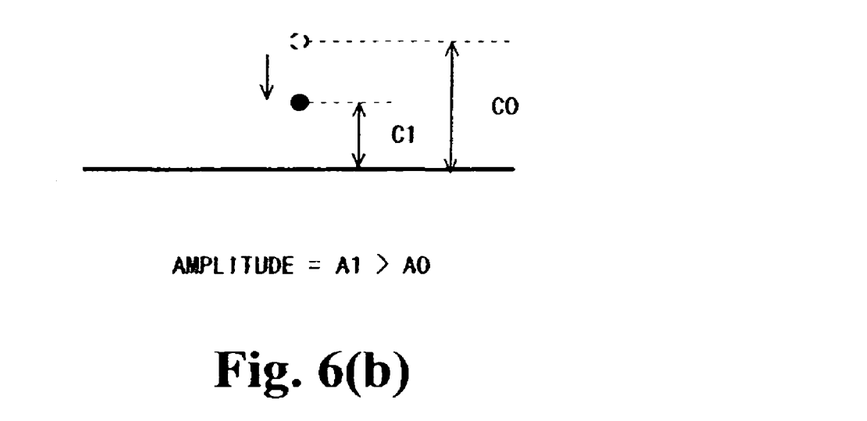
Figure 6C:
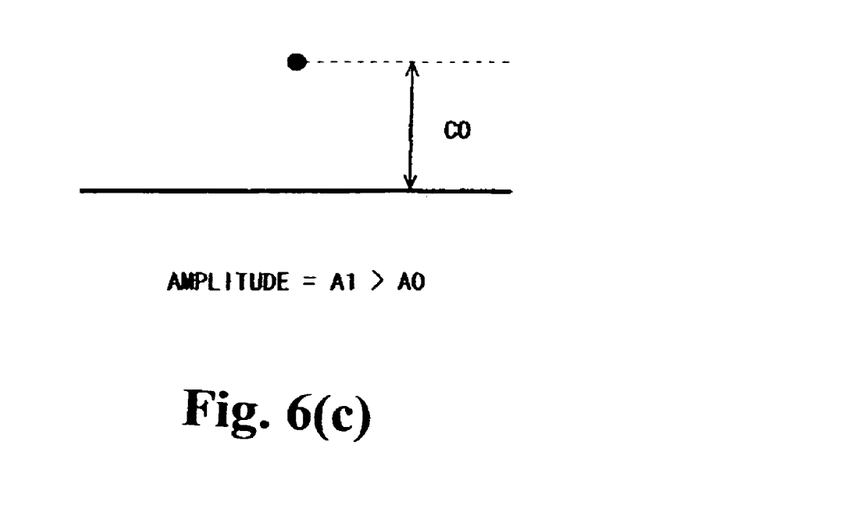

FIGS. 6(*a*)-6(*c*) illustrate the relationship between the signal strength change and the clearance change. In the reference state in FIG. 6(*a*), the clearance of the head element portion 122 is C0 and the signal strength is A0. The frequency of the read-out signal of the head element portion 122 is not limited specifically. As shown in FIG. 6(*b*), if the clearance changes from the reference value C0 to C1, the signal strength changes from the reference value A0 to A1. In the example of FIG. 6(*b*), C1<C0 and A1>A0 are established. In the example of FIG. 5(*b*), the instability has not occurred. FIG. 6(*c*) depicts an example in which the instability has occurred. The clearance remains at the reference value C0 and has not changed. The signal strength, however, has changed from the reference valued A0 to A1.

Figure 7A:
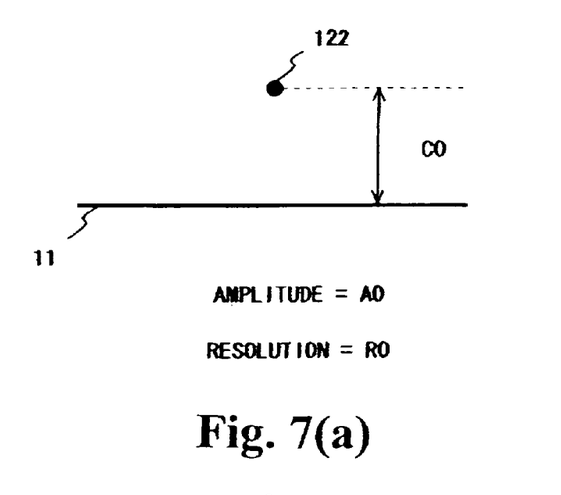
FIGS. 7(a)-7(c) show states resulting from the states in FIGS. 6(a)-6(c) by changing the clearance such that the signal strength changes from A1 to a reference A0.
Figure 7B:
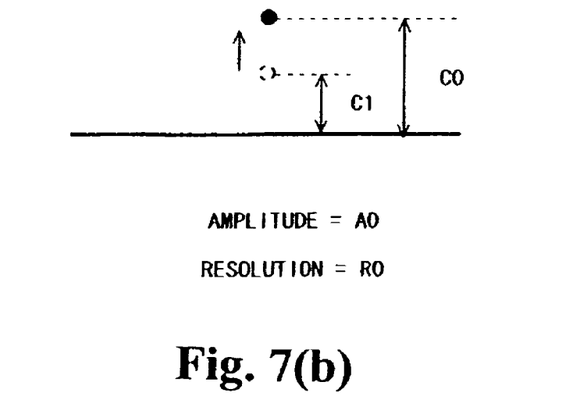

As shown in FIG. 7(*a*), a reference resolution value in the reference state of FIG. 6(*a*) is denoted by R0. FIG. 7(*b*) shows a state resulting from the state of FIG. 6(*b*) by changing the clearance such that the signal strength changes from A1 to the reference value A0. The instability has not occurred, and since the clearance is changed in such a manner that the signal strength stays, the clearances in FIG. 7(*b*) and FIG. 7(*a*) are the same C0. As the clearance is the same as the initial state in FIG. 7(*a*), the resolution in FIG. 7(*b*) is the same R0 as the reference state.

Figure 7C:
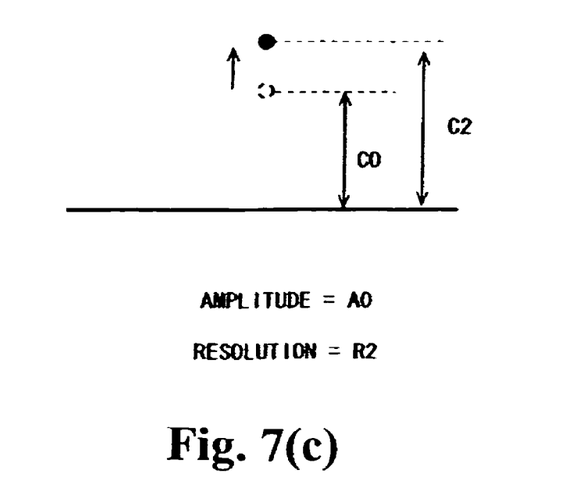

FIG. 7(*c*) shows a state resulting from the state of FIG. 6(*c*) by changing the clearance such that the signal strength changes from A1 to the reference value A0. Since A0<A1 is satisfied, the clearance C2 in FIG. 7(*c*) is larger than the clearance C0 in FIG. 6(*c*) (C2>C0). Because the clearance changes, the resolution R2 in FIG. 7(*c*) is different from the resolution R0 in the initial state.

As understood from the explanation by referring to FIG. 7(*b*), in the head element portion 122 in which the instability has not occurred, the resolution after conforming the signal strength to the reference value A0 coincides with the reference value R0 and does not change. Contrarily, as understood from the explanation by referring to FIG. 7(*c*), in the head element portion 122 where the instability has occurred, the resolution R2 does not coincide with the reference value R0 and has changed after conforming the signal strength to the reference value A0.

The HDC/MPU 23 can identify the head element portion 122 with the instability in accordance with the resolution change. An example of a specific method is described by referring to a block diagram in FIG. 5 and a flowchart in FIG. 8. The HDC/MPU 23 provides the motor driver unit 22 with control data for driving the VCM 15 and moves the head slider 12 to a desired position where data to be read is recorded. Typically, it is in the control area.

Figure 8:
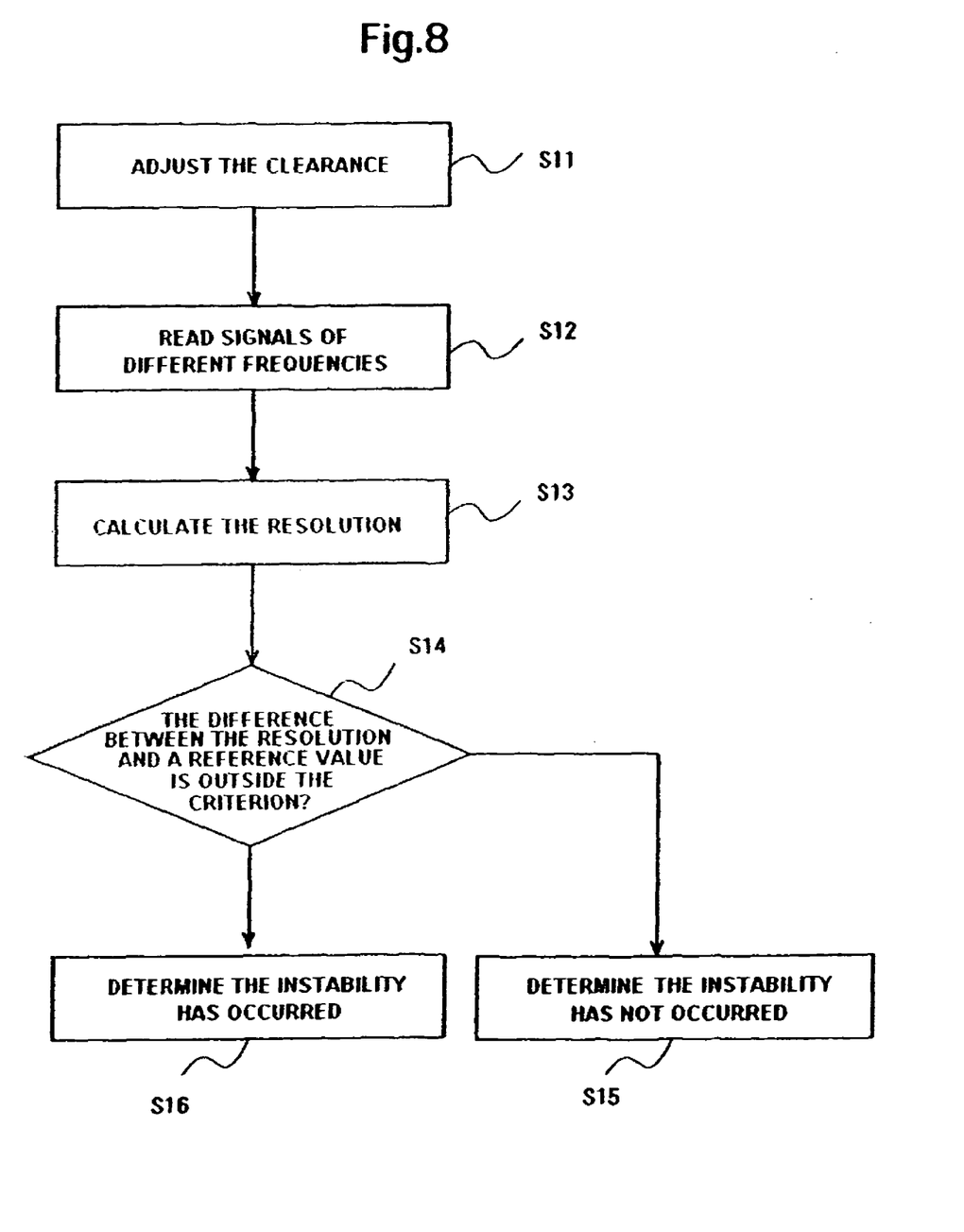
FIG. 8 is a flowchart showing a method of one embodiment for identifying a head element portion in which the instability has occurred in accordance with a resolution change.

The HDC/MPU 23 sets a heater power value (HEATER POWER VALUE) in the AE 13 to adjust the clearance as measuring the signal strength of a specific signal read out by the head element portion 122 (S11). A VGA gain value of the RW channel 21 (VGA VALUE) can be used as the signal strength. The head element portion 122 reads signals of different frequencies under a condition of the signal strengths coinciding with a reference value (S12), and the HDC/MPU 23 calculates the resolution from the measured values.

The HDC/MPU 23 compares the calculated resolution and a preset reference value (S14). The HDC/MPU 23 may compare them directly or compare the resolution indirectly by comparing values further calculated from them (which also represent the resolution). If the difference between them falls within a predetermined criterion range (Y at S14), the HDC/MPU 23 does not determine that the instability has occurred (S15), and the HDC/MPU 23 determines that the instability has occurred (S16) if the difference is outside the criterion.

The HDC/MPU 23 calculates the altitude using a read-out signal of a head element portion 122 which is different from a head element portion 122 where the instability has occurred. This allows more precise altitude calculation. If a plurality of head element portions are implemented, the HDC/MPU 23 preferably determines the altitude (altitude change) based on an average of values obtained from signal strengths of them. This allows more precise altitude determination.

If a large number of head element portions are implemented, the HDC/MPU 23 may use data exclusive of the max and minimum values of the head element portions 122. Besides, the HDC/MPU 23 can identify the occurrence of instability from the clearance change due to the temperature change in addition to the altitude change. The above described determination of instability or head characteristics change may be used in other control in the HDD 1 in addition to the altitude calculation and the TFC. For example, the HDD 1 may lower the use priority of the head slider 12 which has been determined to have instability or alert the host 51 to data in danger to which the head slider 12 corresponds.

Next, a method for calculating the altitude precisely using read-out signal of a head element portion 122 even if the head characteristics has changed. Modifying the equation 2, the following equation is satisfied.

$$\ln(Af1/Af2) = \ln C + 2\pi \times d \times (1/\lambda 2 - 1/\lambda 1) \quad \text{(Equation 3)}$$

Since amplitudes of the write signals (λ1,λ2) are known values, the clearance d can be calculated from the read-out signal strengths (Af1, Af2) of different frequencies.

In the following explanation, the left side of the equation 3, which is one of values representing the resolution, is denoted by F. F at a reference clearance d0 is expressed by F (d=d0). If the present clearance is d1, the following equation is satisfied.

$$F(d=d0) - F(d=d1) = 2\pi \times (d0-d1) \times (1/\lambda 2 - 1/\lambda 1) \quad \text{(Equation 4)}$$

The clearance change (d1-d0) can be calculated from the equation 4. The HDC/MPU 23 determines the altitude (altitude change) from the clearance change amount by referring to a prestored sensitivity.

Even if the head characteristics have changed, the resolution of different frequencies (Af1/Af2) does not change and is constant. Therefore, the clearance can be calculated using the instability even if the head characteristics have changed.

Specifically, the HDC/MPU 23 controls the actuator 16 and head element portion 122 to read out recorded signals of different frequencies at the timing of altitude measurement and calculates the resolution from the values. Then, the HDC/MPU 23 calculates the clearance change from the reference clearance d0 in accordance with the equation 4 and can determine the present altitude from the stored data of sensitivity. The HDC/MPU 23, preferably, uses signals of a plurality of head element portions 122 to determine the altitude like the above example excluding head element portions 122 whose head characteristics have changed significantly.

The forgoing two methods of altitude determination may be applied to a control different from the clearance adjustment. Specifically, the HDC/MPU 23 moves the head slider 12 to a retract position outside of the data recording area if the measured altitude is outside the criterion. The gap (clearance) between the head slider 12 and the magnetic disk 11 reduces with an increase in the altitude (decrease in the atmospheric pressure). Therefore, it enables to prevent the collision of the head slider 12 with the magnetic disk 11 when the altitude is outside the design criterion. The retract position is a parking position on a ramp in a load/unload HDD and a parking position in a retract area on the inner side (or outer side) in contact start and stop.

As set forth above, the present invention is described by way of certain embodiments but is not limited to the above embodiments. A person skilled in the art can easily modify, add, and convert the each element in the above embodiments within the scope of the present invention. For example, the above-described method for identifying a head element portion whose characteristics have changed or altitude measurement using the resolution may be applied to a disk drive with a clearance adjusting mechanism different from TFC, such as a piezo element. These techniques may be used for control in a disk dive different from the clearance adjustment. Embodiments of the present invention can be applied to an HDD equipped with a head slider having either a read element or a write element only or a disk drive device other than the HDD.

What is claimed is:

1. A method comprising:
   adjusting a clearance between a head element portion and a disk such that a read-out signal strength of the head element portion conforms to a corresponding reference value;
   reading out signals of different write frequencies after the clearance adjustment to calculate a value representing a ratio of signal strengths thereof; and
   comparing the calculated value representing the ratio and a corresponding reference value to determine a characteristics change in the head element portion.

2. The method according to claim 1, further comprising determining a signal strength change with respect to a signal from a head element portion difference from a head element portion of which characteristics change is outside a criterion, and
   determining an altitude change based on the determined signal strength change.

3. The method according to claim 2, wherein
   signal strength changes are determined with respect to a plurality of head element portions different from the head element portion whose characteristics change is outside the criterion, and
   the altitude change is determined based on the determined signal strength changes of the plurality of head element portions.

4. The method according to claim 1, further comprising determining a signal strength change with respect to a signal from a head element portion different from a head element portion of which characteristics change is outside a criterion, and
   adjusting a clearance between a head element portion and a disk based on the determined signal strength change.

5. A disk drive device comprising:
   a head element portion for accessing a disk;
   a moving mechanism for supporting and moving the head element portion over the disk;
   an adjusting mechanism for adjusting a clearance between the disk and the head element portion; and
   a controller for controlling the moving mechanism and the adjusting mechanism; wherein
   the adjusting mechanism adjusts a clearance between the head element portion and a disk such that a read-out signal strength conforms to a corresponding reference value,
   the head element portion reads out signals of different write frequencies after the clearance adjustment, and
   the controller calculates a value representing a ratio of signal strengths of the different write frequencies and compares the calculated value representing the ratio and a corresponding reference value to determine whether a characteristics change of the head element portion is outside a criterion.

6. The disk drive device according to claim 5, wherein the controller determines a signal strength change with respect to a signal from a head element portion different from a head element portion of which characteristics change is outside the criterion, and determines an altitude change based on the determined signal strength change.

7. The disk drive device according to claim 5, wherein the controller determines signal strength changes with respect to a plurality of head element portions different from a head element portion of which characteristics change is outside a criterion, and determines the altitude change based on the determined signal strength changes of the plurality of head element portions.

8. The disk drive device according to claim 5, wherein the controller determines a signal strength change with respect to a signal from a head element portion different from a head element portion of which characteristics change is outside a criterion, and adjusts a clearance between a head element portion and a disk based on the determined signal strength change.

9. A method for determining altitude in a disk drive device comprising:
   reading out signals of different write frequencies by a head element portion to calculate a value representing a ratio of signal strengths thereof;
   calculating a clearance change between the head element portion and a disk based on the calculated ratio of signal strengths and a ratio of signal strengths at a reference altitude; and
   determining altitude based on the calculated clearance change.

10. The method according to claim 9, wherein values representing ratios of signal strengths of a plurality of head element portions are calculated, and altitude is determined based on the calculated values.

11. The method according to claim 9, further comprising adjusting a clearance between a head element portion and a disk based on the determined altitude.

12. A disk drive device comprising:
    a head element portion for accessing a disk; a moving mechanism for supporting and moving the head element portion over the disk;
    a adjusting mechanism for adjusting a clearance between the disk and the head element portion; and
    a controller for controlling the moving mechanism and the adjusting mechanism; wherein,
    the head element portion reads out signals of different write frequencies, and
    the controller calculates a value representing a ratio of signal strengths of the different write frequencies, calculates a clearance change between the head element portion and a disk based on the calculated ratio of signal strengths and a ratio of signal strengths at a reference altitude, and determines altitude based on the calculated clearance change.

13. The disk drive device according to claim 12, wherein the controller calculates values representing ratios of signal strengths of a plurality of head element portions and determines altitude based on the calculated values.

14. The disk drive device according to claim 12, wherein the controller adjusts a clearance between a head element portion and a disk based on the determined altitude.

15. A disk drive device comprising:
a slider for flying over a rotating disk,
a head element portion on the slider for accessing the disk,
a heater on the slider for protruding the head element portion by thermal expansion to adjust a clearance between the disk and the head element portion;
a moving mechanism for supporting and moving the slider;
a controller for controlling the moving mechanism and the heater, and
adjusting the clearance by reducing a heater power to the heater in accordance with an increase in altitude;
the head element portion reads out signals of different write frequencies, and
the controller calculates a value representing a ratio of signal strengths of the different write frequencies, calculates a clearance change between the head element portion and a disk based on the calculated ratio of signal strengths and a ratio of signal strengths at a reference altitude, and determines altitude based on the calculated clearance change.

16. The disk drive device according to claim 15, wherein the controller adjusts a clearance between the head element portion and the disk such that a read-out signal strength of the head element portion conforms to a corresponding reference value,
the head element portion reads out signals of different write frequencies after the clearance adjustment, and
the controller calculates a value representing a ratio of signal strengths of the different write frequencies and compares the calculated value representing the ratio and a corresponding reference value to determine whether a characteristics change of the head element portion is outside a criterion.

* * * * *